FREEMAN & STONER.
Car Coupling.
No. 61,003. Patented Jan. 8, 1867.
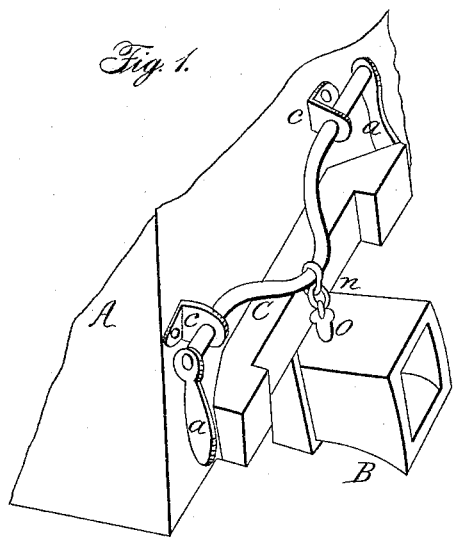
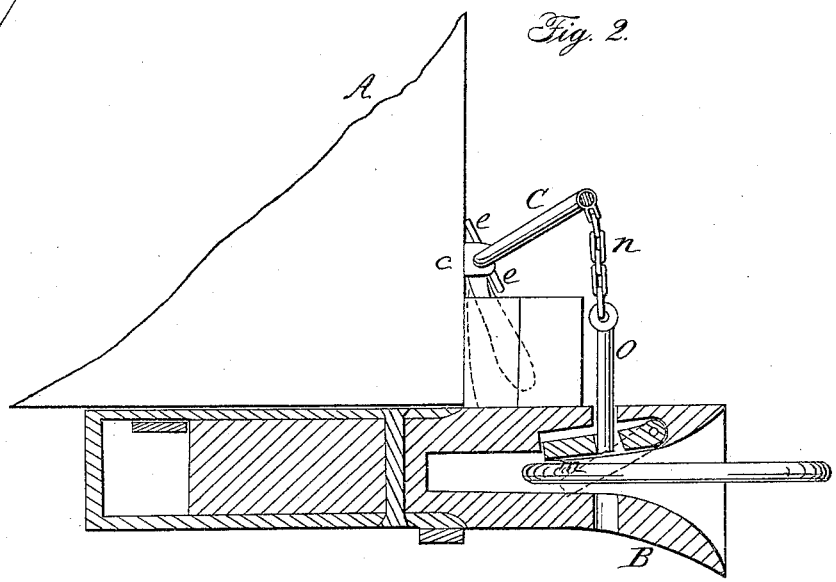
Witnesses:
P. T. Dodge
T. T. Prosser
Inventor:
A. M. Freeman
A. M. Stoner
By M. Dodge, attys.

United States Patent Office.

A. M. FREEMAN, AND A. M. STONER, OF SPRINGFIELD, OHIO.

*Letters Patent No. 61,003, dated January 8, 1867.*

IMPROVEMENT IN CAR-COUPLING.

*The Schedule referred to in these Letters Patent and making part of the same.*

TO ALL WHOM IT MAY CONCERN:

Be it known that we, A. M. FREEMAN, and A. M. STONER, of Springfield, in the county of Clark, and State of Ohio, have invented certain new and useful improvements in Car-Couplings; and we do hereby declare that the following is a full, clear, and exact description thereof, reference being had to the accompanying drawings, making part of this specification, and to the letters of reference marked thereon, like letters indicating like parts wherever they occur. To enable others skilled in the art to construct and use the invention, we will proceed to describe it.

Figure 1 is a perspective view; and

Figure 2 is a longitudinal vertical section.

Our invention has for its object so constructing and arranging the coupling devices that the cars, when brought together, will automatically operate the coupling devices and unite the cars.

A represents the body of a box car having the bumper B attached in the usual manner. C represents a shaft placed transversely across the end of the car and mounted in supports, c, in which it turns freely. This shaft has a handle, a, attached at each end, by which it may be operated by a person standing at either side of the car, and who therefore need not get between the cars either to couple or uncouple them. At the centre, the shaft C is bent as represented, and to the extremity of this bent portion the bolt o is attached by a chain, n. It will thus be seen that by taking hold of either of the handles a and turning the shaft C up, the bolt o will be lifted and the cars thus uncoupled. A plate, m, is fitted in a recess on the upper inner surface of the bumper B, as shown in fig. 2, this plate being pivoted at its front end so as to permit its rear end to drop down as represented in red. This plate m is provided with a hole corresponding with that in the bumper for the bolt o to pass through, and when the link D is inserted in the cavity of the bumper, the end of the link hits against the plate and raises it up, permitting the bolt o to drop down and secure the link in place; when the link D is withdrawn and the bolt o raised, the plate m drops down, whereby the hole in it is thrown so far out of line with the hole in the bumper that the bolt o cannot drop down, but will be caught on the edge of the hole in plate m, and be held up ready to descend whenever the plate m shall be lifted by the introduction of the link into the cavity of the bumper. A pin, e, is inserted through the shaft C, as shown in fig. 2, to limit the rotation of the shaft and thus prevent the bolt o from being lifted entirely out of the hole in the bumper. All that is necessary to operate this device is to take hold of either of the handles a and turn the shaft C far enough to raise the bolt o out of the link, which will not only uncouple the cars, but also set it ready for automatically coupling them when brought together again. As these handles a may be reached without getting between the cars, it will be seen that the danger attendant upon the ordinary method of coupling cars, and by which persons are frequently killed or injured, is entirely obviated.

Having thus described our invention, what we claim, is—

The combination of the shaft C, bolt o, and latch m, when said parts are arranged to operate in connection with each other, substantially as and for the purpose herein set forth.

A. M. FREEMAN,
A. M. STONER.

Witnesses:
GEO. ARTHUR,
S. O. CARPENTER.